United States Patent [19]

Adams et al.

[11] 4,144,301

[45] Mar. 13, 1979

[54] SEPARATORS FOR ELECTROLYTIC CELLS

[75] Inventors: Lionel B. Adams; Peter J. Fydelor; Gordon Partridge; Kenneth B. Pithouse, all of Swindon, England

[73] Assignee: The Secretary of State for Defence in Her Britannic Majesty's Government of the United Kingdom of Great Britain and Northern Ireland, London, England

[21] Appl. No.: 657,629

[22] Filed: Feb. 12, 1976

Related U.S. Application Data

[62] Division of Ser. No. 400,669, Sep. 25, 1973, abandoned.

[30] Foreign Application Priority Data

Sep. 25, 1972 [GB] United Kingdom ............... 44137/72

[51] Int. Cl.² .......................................... H01M 3/00
[52] U.S. Cl. .............................. 264/126; 260/857 G; 260/878 R; 260/884; 264/22; 264/131; 264/272; 429/136; 429/137
[58] Field of Search ................. 264/22, 104, 109, 126, 264/125, 131, 272; 156/598; 429/136, 137; 427/249; 260/851 G, 878 R, 884

[56] References Cited

U.S. PATENT DOCUMENTS

| | | | |
|---|---|---|---|
| 2,673,230 | 3/1954 | Brennan | 429/137 |
| 3,023,261 | 2/1962 | Louis et al. | 429/137 |
| 3,027,346 | 3/1962 | Rugg et al. | 260/878 R |
| 3,211,808 | 10/1965 | Young et al. | 260/878 R |
| 3,354,247 | 11/1967 | Zehender et al. | 264/126 |
| 3,427,206 | 2/1969 | Scardaville et al. | 136/146 |
| 3,489,699 | 1/1970 | Battaerd et al. | 260/886 |
| 3,585,081 | 6/1971 | Mirman | 136/146 |
| 3,625,771 | 12/1971 | Arrance et al. | 429/136 |
| 3,713,890 | 1/1973 | Strier et al. | 264/126 |
| 3,892,594 | 7/1975 | Charlesby et al. | 264/272 |

FOREIGN PATENT DOCUMENTS 1328510  8/1973  United Kingdom ................... 264/126

*Primary Examiner*—Jeffery R. Thurlow
*Attorney, Agent, or Firm*—Cushman, Darby & Cushman

[57] ABSTRACT

An Electrolytic cell having a separator positioned between a positive electrode and a negative electrode is disclosed in which the separator is a moulding of polymer material derived from a particulate polymer material having a polar graft-copolymerized surface. The separator may be deposited as a coherent film of the surface of an electrode by sintering the particulate material into a coating around the electrode using heat and/or pressure. Alternatively a shaped article such as a case, envelope, sheet film or the like may be prepared and used to wrap around or encase an electrode.

9 Claims, No Drawings

SEPARATORS FOR ELECTROLYTIC CELLS

This is a division of application Ser. No. 400,669 filed Sept. 25, 1973, now abandoned.

The present invention relates to separators for electrolytic cells. Semi-permeable separators are included in electrolytic cells around the electrodes to retain soluble ionic species formed at the electrode in the vicinity thereof. Separators are applicable to primary cells and also to secondary cells in which soluble ionic species may be reversibly formed in the course of the charge/discharge cycle to which such cells are subjected. Such separators are preferably selectively semi-permeable in that they limit transport of the particular ionic species reversibly formed during the charge/discharge cycle but permit passage of current carrying ions, thus enabling the cell to function. In general for the best operation of secondary electrolytic cells it is advisable to retain the ionic species in the vicinity of the appropriate electrode since metal deposits elsewhere may lead to inefficient operation of the cell, for example, loss of capacity, or even in extreme cases electrical shorting of the cell leading to failure.

U.K. Pat. No. 1,328,510 discloses a process whereby a separator is formed by encapsulating an electrode material in a layer of base polymer, immersing in an ethylenically unsaturated carboxylic acid monomer, and the monomer is then copolymerised with the base polymer substrate.

According to the present invention there is provided an electrolytic cell having a separator positioned between a positive electrode and a negative electrode wherein the separator comprises a moulding of polymer material derived from particulate polymer material comprising particles having nucleus of thermoplastics material and an outer polar graft-copolymer surface.

Preferred particulate polymer material comprises particles having a nucleus of thermoplastic material surrounded by a cross-linked polymer layer and an outer polar graft-copolymer and wherein least 30% by weight of the particles have a diameter of less than 100 μm. Suitable particulate polymer material is disclosed in copending patent application Ser. No. 400,670 filed Aug. 25, 1973, now abandoned.

The term particles as used herein may include regularly and irregularly shaped powder, fluff, fibre, pellet and any other form suitable for the production of shaped articles.

Preferably the thermoplastics material forming the nucleus of the particles of the particulate polymer material also forms the base polymer of the outer graft-copolymer layer and when cross-linked the cross-linked polymer layer.

Preferably thermoplastics material is thermoplastics material selected from polyethylene, polypropylene, polytetrafluroethylene, partially fluorinated polyolefins, partially chlorinated polyolefins or nylons. Preferably the co-monomer of the outer graft-copolymer layers is reactive vinyl-monomer selected from acrylic acid, methacrylic acid, and other ethylenic carboxylic acids, acrylamides or methacrylamides.

In a preferred aspect of the present invention the moulding of polymer material forming the separators of the electrolytic cell is produced by a process which includes the step of depositing the moulding of separator material on the surface of one of the electrodes by sintering said particulate polymer material into a coherent coating around the electrode using heat and/or pressure.

In an alternative aspect of the present invention the particulate polymer material is moulded a shaped article such as a case, envelope, sheet, film or the like which is used to wrap around or encase one of the electrodes.

Particulate polymer having a polar graft-polymerised surface is preferably prepared by graft-polymerisation of a particulate thermoplastic polymer in a solution of a reactive monomer from which a polar graft may be obtained.

Suitable solvents in which said monomers may be dissolved include water, acetone, lower alcohols up to and including butanol, benzene, xylene, toluene and hexane and mixtures of these solvents in any relative concentrations. Chain transfer agents, chain termination agents, free radical scavengers and surface scavengers may be admixed with the monomer carrying solvents as is commonly practiced in the graft-polymerisation art. Preferably the monomer concentration in the solution is in the range 5% to 50% V/V and the preferred polymer concentration with respect to the solution is in the range 20 to 400 gm $l^{-1}$.

Initiation of graft polymerisation of the monomers to the particulate thermoplastic material is preferably performed in a solution of the monomer but initiating centres may be generated by means of ionising radiation, ultraviolet/visible light, heat and by chemical initiators such as the organic peroxides and other free radical initiators or ionic initiators such as Lewis acids. Where initiation is by means of ionising radiations such as accelerated electrons or gamma photons the dose is preferably limited to $1 \times 10^5$ rad to $5 \times 10^5$ rad, and the preferred dose rate does not exceed $3 \times 10^6$ rad $hr^{-1}$.

Following graft polymerisation, the product particulate polymer material having a polar graft-polymerised surface is separated from solvent, residual monomer, homopolymer and any residual scavenger or other additives. This separation is carried out by any suitable means. When carboxylic acid monomers are employed, the final graft copolymer may be left in its acid form or may alternatively be converted to and used in a metal salt form.

Preferably graft copolymer yields, that is the weight of polymerised monomer/weight of base polymer in the product copolymer, of between about 10% and 60% are obtained in processes for the production of said particulate polymer material.

It is believed that between about 0.5% and 50% by weight of the base polymer in the product copolymer is cross-linked.

Particulate polymer material having a polar graft-copolymerised surface may be used to prepare shaped articles of strength intermediate between those obtained by hot moulding from conventional thermoplastics particles and other cross-linked particles not having a polar surface. It is believed that strong intermolecular forces operate between the polar chemical groups on graft chains attached to neighbouring particles and such bonds are probably proton or hydrogen intermolecular bonds, although possibly with some chain entanglement also taking place. Shaped articles fabricated from said particulate material may fragment to yield the original particles when heated to a predetermined temperature, hereinafter called recovery temperature and which is below the melting (or softening) temperature of the material. For this reason it is necessary that particulate polymer material selected for use as a separator in an electrolytic cell has a recovery temperature greater than the maximum temperature at which the electrolytic cell may be operated.

Electrolytic cells of the present invention may facilitate production processes. Current manufacturing process wherein membranes are wrapped around electrodes are inconvenient. The advantageous results obtained by the use of encapsulated electrodes as disclosed in copending patent application Ser. No. 100,828, filed Dec. 22, 1970, now U.S. Pat. No. 3,892,594 are offset by the difficulties of graft copolymerising in situ on the electrode. However the use of particulate polymer material having a polar surface graft allows a conveniently shaped electrode container to be moulded, or alternatively sintering of the particulate material in contact with the electrode to produce an encapsulated electrode.

Processes for the production of separator material, and its use in electrolytic cells in accordance with the present invention, will now be described by way of example only.

EXAMPLE 1

"Telcon" low density polyethylene powder was sieved through a 170 mesh B.S. sieve. 80g of the sieved powder was added to 1 liter aqueous solution containing 50% V/V acrylic acid, 50% V/V distilled water to which had been added 4 gms per liter of analar grade ferrous sulphate. The mixture was irradiated in a glass vessel at room temperature by $\gamma$ photons from a $^{60}Co$ source to receive a total dose of $5 \times 10^5$ rad at an average dose rate of $3.3 \times 10^5$ rad/hr, the mixture being continuously stirred and purged with 'white spot' nitrogen throughout the time of irradiation. After irradiation the mixture was filtered through a linen gauze to remove treated powder.

The powder was extracted in an excess of 20% w/v KOH aqueous solution at room temperature for 30 minutes, further extracted in an excess of 20% v/v aqueous solution of HCl for a further 30 minutes and washed with an excess of distilled water. The extracted acid form grafted powder was dried in a hot-air oven for 2 hours at 60° C. The grafted powder was estimated to be composed of 40% w/w copolymerised acrylic acid. The grafted powder was placed in an excess of 20% w/v KOH aqueous solution at room temperature for 10 minutes in order to convert the graft copolymer into its potassium salt form and then dried in a hot-air oven at 60° C. for 2 hours.

Grafted powder (2.0g) was placed in a metal template (1.80 × 1.80 × 0.053 inches) on both sides of a silver electrode (1.65 × 1.65 × 0.026 inches) contained therein. The assembly was placed between two sheets of photographic glazing plate, between the plattens of an electrically heated, water cooled hydraulic press. The press was preheated to 130° C., pressure applied 8000 lb (i.e. 2480 p.s.i.) for 1 minute, cooled under pressure to 40° C.

The above electrode when discharged against two formed zinc electrodes after a 20 min soak in 40% KOH gave an open circuit voltage (OCV) of 1.60 volts, 1.34 volts at a current density (CD) of 260 A/m$^2$ and 1.24 volts at a current density of 520 A/m$^2$.

EXAMPLE 2

Grafted powder was prepared as described in Example 1 and 1.9g of the grafted powder was used to encapsulate a zinc electrode (1.65 × 1.65 × 0.046 inches) using the pressing conditions described in Example 1.

On discharge against two positives an OCV of 1.75 volts was obtained, 1.42 volts at a CD of 260 A/m$^2$ and 1.30 volts at 520 A/m$^2$.

EXAMPLE 3

Grafted powder was prepared as described in Example 1, and three silver electrodes encapsulated. A cell was constructed using the three encapsulated positives and four non-encapsulated zinc electrodes and a single layer of cellophane. The cell was filled with 40% KOH, and discharged at 2.5A after a 24 hour stand.

Nominal capacity 4.5 A hr
Actual capacity to 1.2 volts — 4.1 A hr
Initial voltage 1.41, Plateau voltage 1.37

EXAMPLE 4

Grafted powder was prepared as described in Example 1 and was used to prepare three encapsulated zinc electrodes as described in Example 2, except that the samples were pressed at 380 p.s.i. A cell was constructed using the three encapsulated negative electrodes and four silver electrodes and a single layer of cellophane. The cell was filled with 40% KOH and discharged at 2.5A after a 24 hour stand.

Nominal capacity 4.5 A hr
Actual capacity to 1.2 volts — 1.6 A hr
Initial voltage 1.40, plateau voltage 1.37

EXAMPLE 5

Grafted powder was prepared as described in Example 1 and used to prepare 2 encapsulated zinc electrodes as described in Example 2. If cell was constructed from the 2 encapsulated negatives, 3 positives and a layer of cellophane. Battery electrolyte 40% KOH. OCV after 6 hours measured as 1.8 volts. Capacity 2.5 A hr (Nominal Capacity 3 A hr) on discharge at 1 amp to 0.6 volts.

EXAMPLE 6

Grafted powder was prepared as described in Example 1, but 1% VV of a liquid detergent (Teepol) was added to the grafting solution. The grafted powder was estimated to be composed of 60% w/w acrylic acid. A cell was constructed as described in Example 5. OCV after 6 hours measured as 1.8 volts. Capacity 1.8 A hour (Nominal Capacity 3 A hr) on discharge at 1 amp to 0.6 volts.

EXAMPLE 7

Grafted powder was prepared as described in Example 1 and used to encapsulate two silver electrodes. A cell was constructed having the 2 encapsulated positives, 3 negatives and one layer of cellophane, electrolyte 40% KOH.

OCV after 6 hours measured as 1.78 volts.
Capacity 2.75 A hr (Nominal Capacity 3 A hr) on discharge at 1 amp to 0.6 volts.

EXAMPLE 8

Grafted powder was prepared as described in Example 6 and used to encapsulate two silver electrodes. A cell was constructed having the two encapsulated positives, 3 negatives and one layer of cellophane. The electrolyte was 40% KOH. OCV after 6 hours measured 1.82 volts. Capacity 2.75 A hr (Nominal Capacity 3 A hr) on discharge at 1 amp to 0.6 volts.

EXAMPLE 9

Grafted powder was prepared in potassium salt form, as described in Example 1. Mercuric oxide electrodes of similar dimensions to the silver electrodes referred to in earlier examples, were encapsulated as for Example 1 and discharged in alkaline electrolyte against an A-50 size anode (10g Zn amalgam on each side of a Cu gauge carrier, $1\frac{7}{8}'' \times 1\frac{3}{8}''$). Performances on discharge are tabulated below and compared with results obtained using a standard separator (Synpor, microporous PVC barrier).

| Type | OCV volts | Running Time hours | Current Drain amps | Load-ing ohms | Capacity A hr |
|---|---|---|---|---|---|
| Standard | 1.352 | 10.7 | 0.126 | 10 | 1.348 |
| Encapsulated) 1 | 1.362 | 12.75 | 0.122 | 10 | 1.555 |
| Electrode) 2 | 1.357 | 12.5 | 0.120 | 10 | 1.500 |

EXAMPLE 10

Grafted powder was prepared as described in Example 1, and used to encapsulate a sintered nickel electrode of similar dimensions to those of the silver electrode referred to in examples 1 to 8. Pressing conditions were as described in Example 1. The encapsulated nickel electrode was discharged against two sintered cadmium electrodes in alkaline electrolyte at 610 mA (i.e. theoretical current for complete discharge in 1 hr). The initial voltage of 1.17 volts fell to 1 volt in 55 mins. The discharge voltage was 100 mV down on a standard system using a felt separator.

Electrolytic cells of the present invention include batteries, fuel cells and cells used for the production of metals and compounds by electrochemical separation methods.

What we claim is:

1. A process for the production of a moulding of polymer material forming a separator in an electrolytic cell, having a separator positioned between a positive electrode and a negative electrode, said process including the step of depositing a particulate polymer material having a nucleus of thermoplastic polymer material surrounded by a polar graft copolymer layer grafted on the surface of one of the electrodes and thereafter sintering said thus deposited particulate polymer material into a coherent coating around the electrode using heat and/or pressure, wherein said particulate polymer material comprises particles having a nucleus of thermoplastic polymer material surrounded by a cross-linked polymer layer and an outer polar graft copolymer layer wherein at least 30% by weight of the particles have a diameter of less than 100$\mu$m.

2. A process for the production of a separator in an electrolytic cell having a separator positioned between a positive electrode and a negative electrode, said process including the step of molding a particulate polymer material having a nucleus of thermoplastic polymer material surrounded by a polar graft copolymer layer in the form of a shaped article which is used to wrap around or encase one of the electrodes, wherein said particulate polymer material comprises particles having a nucleus of thermoplastic polymer material surrounded by a cross-linked polymer layer and an outer polar graft copolymer layer wherein at least 30% by weight of the particles have a diameter of less than 100$\mu$m.

3. A process as claimed in claim 2 wherein said shaped article is in the form of a case, envelope, sheet or film.

4. A process as claimed in claim 1 in which the thermoplastic polymer material forming the nucleus of the particles of the particulate polymer material also forms the base polymer of the outer polar graft copolymer layer and, when cross-linked, the cross-linked polymer layer.

5. A process as claimed in claim 4 in which the thermoplastic polymer material is selected from the group consisting of polyethylene, polypropylene, partially fluorinated polyolefins, partially chlorinated polyolefins, nylons and polytetrafluoroethylene.

6. A process as claimed in claim 5, in which the co-monomer of the outer polar graft copolymer layer is a monomer selected from acrylic acid, methacrylic acid, other ethylenic carboxylic acids, acrylamides or methacrylamides.

7. A process as claimed in claim 6 in which the particulate polymer material is prepared by the graft-copolymerisation of a particulate thermoplastic polymer material in a solution of reactive monomer.

8. A process as claimed in claim 7 in which the weight of polymerised monomer per weight of base polymer in the product copolymer is between 10 and 60 percent.

9. A process as claimed in claim 8 in which between 0.5 and 50 percent by weight of the base polymer in the product copolymer is cross-linked.

* * * * *